(12) United States Patent
Schroeder et al.

(10) Patent No.: US 6,502,826 B1
(45) Date of Patent: Jan. 7, 2003

(54) HYDRAULIC CYLINDER PISTON SEAL

(75) Inventors: Jeffrey A. Schroeder, Peoria, IL (US); Richard L. Tennis, Eureka, IL (US)

(73) Assignee: Caterpillar Inc, Peoria, IL (US)

( * ) Notice: Subject to any disclaimer, the term of this patent is extended or adjusted under 35 U.S.C. 154(b) by 25 days.

(21) Appl. No.: 09/699,943

(22) Filed: Oct. 30, 2000

(51) Int. Cl.[7] .................................................. F16J 9/06
(52) U.S. Cl. ...................... 277/468; 277/482; 277/584; 277/589
(58) Field of Search ................................ 277/434, 437, 277/467, 468, 482, 474, 589, 584

(56) References Cited

U.S. PATENT DOCUMENTS

| | | | | |
|---|---|---|---|---|
| 2,420,104 A | * | 5/1947 | Smith | |
| 3,300,225 A | * | 1/1967 | Shepler | |
| 3,394,941 A | | 7/1968 | Traub | |
| 3,401,989 A | * | 9/1968 | Gies | |
| 3,418,001 A | * | 12/1968 | Rentschler et al. | |
| 3,614,114 A | * | 10/1971 | Traub | |
| 3,718,338 A | * | 2/1973 | Traub | |
| RE28,105 E | * | 8/1974 | Traub | |
| 3,860,250 A | | 1/1975 | Lundquist | 277/589 |
| 3,971,298 A | | 7/1976 | Kulig | |
| 3,999,767 A | * | 12/1976 | Sievenpiper | |
| 4,185,842 A | | 1/1980 | Magara | |
| 4,203,607 A | * | 5/1980 | Brieger | |
| 4,270,440 A | | 6/1981 | Lewis, II | |
| 4,346,903 A | | 8/1982 | Heiermann | |
| 4,468,041 A | * | 8/1984 | Yoshimura et al. | |
| 4,474,106 A | | 10/1984 | Durenee | |
| 4,652,000 A | | 3/1987 | O'Rourke | |
| 4,714,259 A | * | 12/1987 | Mack et al. | |
| 5,269,537 A | | 12/1993 | Kiesel | |
| 5,328,177 A | * | 7/1994 | Lair et al. | |
| 5,467,689 A | * | 11/1995 | Carlin et al. | 92/172 |
| 5,743,535 A | | 4/1998 | Hodgins | |
| 6,217,030 B1 | * | 4/2001 | Zitting | 244/435 |

\* cited by examiner

Primary Examiner—Chuck Y. Mah
Assistant Examiner—Alison K. Pickard

(57) ABSTRACT

A piston seal for sealing a high pressure hydraulic cylinder includes a rigid seal ring, an elastomeric energizer ring, and a mask structure. The mask structure is effective in decreasing explosive decompression of air entrapped under the surface of the elastomeric energizer ring that causes pitting and deterioration of the elastomer of the energizer ring by masking the energizer ring material from harmful ingress and egress of air.

18 Claims, 4 Drawing Sheets

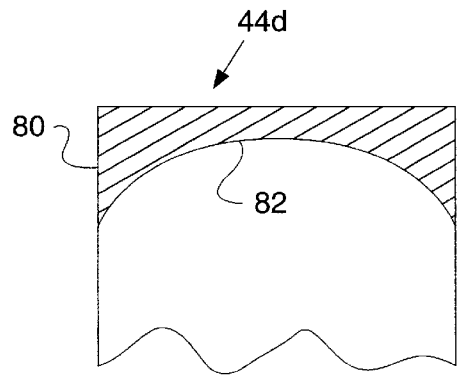
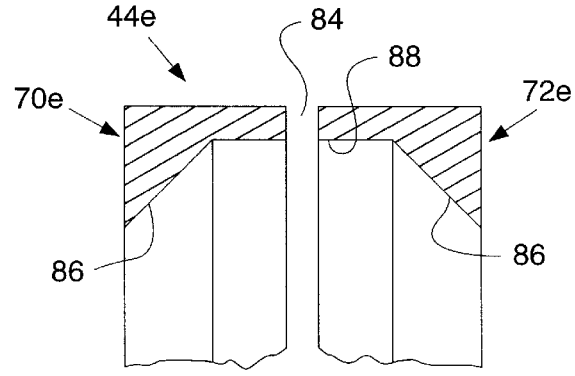
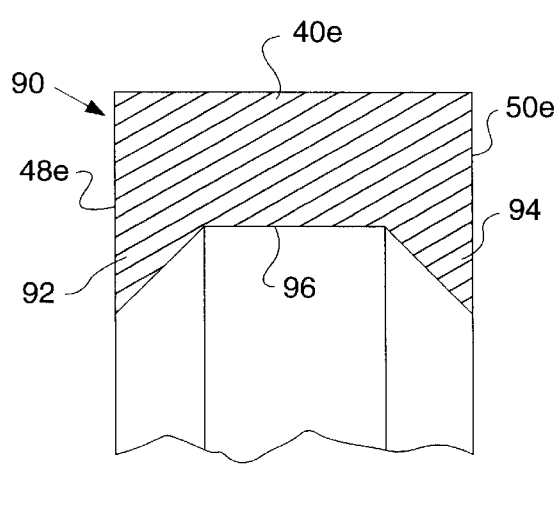
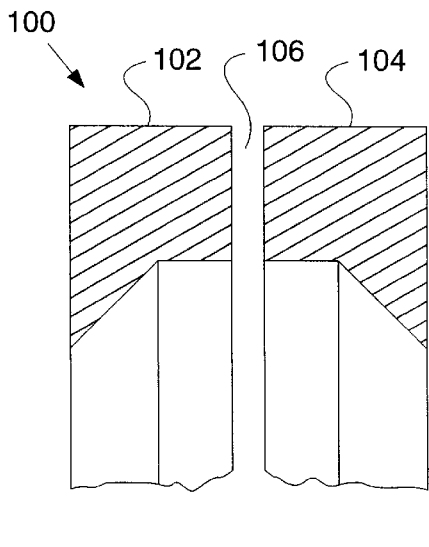

HYDRAULIC CYLINDER PISTON SEAL

TECHNICAL FIELD

This invention relates generally to a piston seal suitable for use in high pressure hydraulic cylinders commonly employed in work implements and the like.

BACKGROUND ART

Piston seals for high pressure hydraulic cylinders are typically mounted within a seal groove formed about the periphery of the piston of such hydraulic cylinders. Such high pressure piston seals include a rigid seal ring and an elastomeric energizer or load ring. The load ring is mounted in the seal groove under the seal ring and is compressed so as to provide a radial force on the seal ring to urge the seal ring into sealing engagement with the inner bore of the cylinder. Load rings typically have a round or elliptical cross-sectional configuration in a free (non-compressed) state, whereas the chamber in which the load ring is mounted is generally rectangular in cross-section. Thus, when the load ring is mounted in the chamber in the seal groove under the seal ring, voids are created in the corners of the seal groove where portions of the exterior surface of the load ring are exposed or are not contacting either one of the walls of the seal groove or the inner side of the seal ring, even when the load ring is in a compressed state. When in a compressed state, the load ring bulges into, but does not completely fill, such voids.

In some applications, such as lift cylinders for hydraulic excavators, other earth moving equipment and the like, the piston seal may be exposed to extremely high pressure for extended periods of time. In addition, air may be ingested into the hydraulic fluid by means typical to mobile hydraulics such as by pump cavitation, by foaming of reservoir oil and by air entrainment in the oil supply. As a consequence, such air may be impinged against the exposed surfaces of the load ring for long periods of time under high pressure. It has been found that because the exposed surfaces of the load ring are stretched and under tension, air can permeate into the load ring through minute cracks or pores in the skin surface of the load ring. Subsequent actuation of the hydraulic cylinder can cause the rapid release of the high pressure and of the air now entrapped inside the load ring. When this occurs, the entrapped air undergoes a rapid decompression, which can "blow out" fragments from the exposed surfaces of load ring. This process is called explosive decompression. Over time and after numerous repetitions of such events, the load ring deteriorates to an extent to cause the seal to fail.

The present invention is directed to overcoming one or more of the problems as set forth above.

DISCLOSURE OF THE INVENTION

A seal for a hydraulic cylinder piston capable of generating and withstanding high fluid pressures. The seal includes a split rigid seal ring adapted for receipt within a seal groove and having an outer cylindrical sealing surface adapted for sealingly engaging an inner hydraulic cylinder wall of a hydraulic cylinder.

The seal also includes an elastomeric energizer ring disposed within the seal groove radially inboard of the rigid seal ring. The elastomeric energizer ring is adapted to generate a radial force on the rigid seal ring for urging the outer cylindrical sealing surface into sealing engagement with the inner hydraulic cylinder wall of the hydraulic cylinder. The energizer ring defines a pair of annular cavities at end junctures between the rigid seal ring and the elastomeric energizer ring. The elastomeric energizer ring also seals the inner diameter of the rigid seal ring and seal groove.

A pair of rigid wedge rings are shaped and fitted to substantially fill each respective annular cavity. When installed, both wedge rings are capable of creating a pressure differential between the pressure of said hydraulic cylinder and the elastomeric energizer ring sufficient to prevent significant gas infiltration into the elastomeric energizer ring and to prevent damage to the elastomeric energizer ring due to explosive decompression when the hydraulic cylinder is depressurized.

BRIEF DESCRIPTION OF THE DRAWINGS

FIG. 8 is an enlarged cross-sectional view of a fourth alternate embodiment of mask structure of the present invention;

FIG. 9 is an enlarged cross-sectional view of a fifth alternate embodiment of mask structure of the present invention;

FIG. 10 is an enlarged cross-sectional view of a sixth alternate embodiment of mask structure of the present invention;

FIG. 11 is an enlarged cross-sectional view of a seventh alternate embodiment of mask structure of the present invention;

BEST MODE FOR CARRYING OUT THE INVENTION

Figure 1:
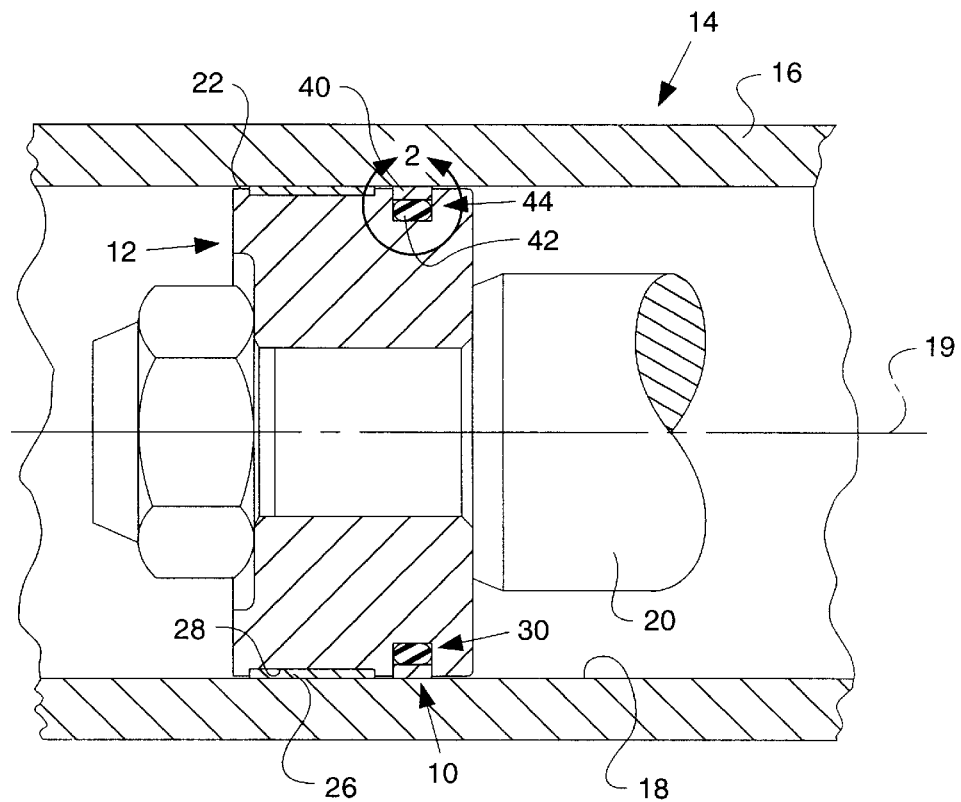
FIG. 1 is a fragmentary cross-sectional view of a hydraulic cylinder with a piston seal of the present invention.

Referring more particularly to the drawings, a piston seal embodying the principles of the present invention is generally indicated at 10 in FIG. 1. Such piston seal 10 is adapted for use in a piston 12 of a high pressure hydraulic cylinder 14 of the type used on construction and earthmoving equipment, such as hydraulic excavators, loaders, off-highway trucks, cranes and the like. Such hydraulic cylinders 14 are preferably double acting and have operating pressures in the range from 0 to 3,000 psi or higher. Hydraulic cylinders 14 typically have a steel tubular body 16 having a cylindrical inner cylinder bore 18 disposed about a longitudinal axis 19 and in which the piston 12 is reciprocatably mounted. A rod 20 is mounted to the piston 12 and extends from a rod end (not shown) of the hydraulic cylinder 14 in a conventional manner.

Figure 2:
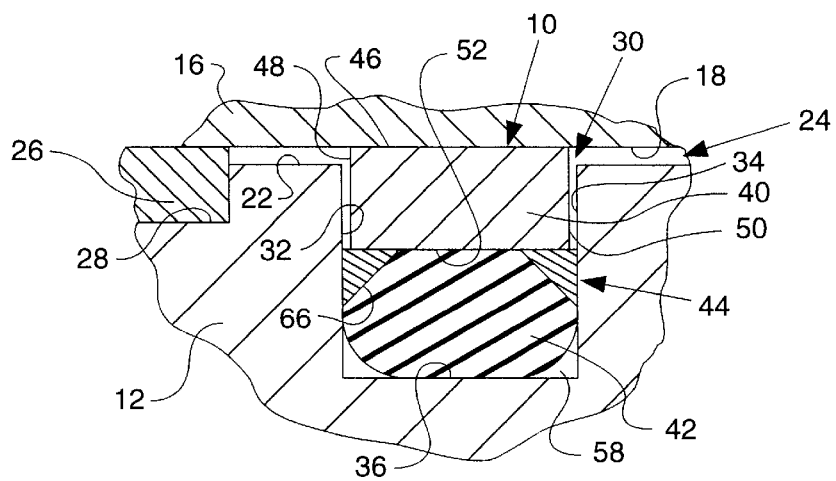
FIG. 2 is an enlarged cross-sectional view of the piston seal illustrating a mask structure of the present invention.

The piston 12 has an outer cylindrical surface 22 of a diameter slightly less than the cylinder bore 18 so as to provide a small clearance gap 24 between the piston surface 22 and the cylinder bore 18 so as to prevent steel on steel sliding contact between the piston 12 and the cylinder body 16. Instead, the piston 12 preferably has a slide bearing 26 of a suitable material mounted in a bearing groove 28 formed into the cylindrical surface 22 of the piston 12. The piston 12 also has a seal groove 30 formed into the cylindrical surface 22 thereof for mounting the seal 10. The seal groove 30 has a generally rectangular cross-sectional configuration with a pair of opposite radial side surfaces 32, 34 and an axial bottom surface 36 extending between the side surfaces 32, 34 (as shown in FIG. 2).

The seal 10 of the present invention includes a rigid seal ring 40, an elastomeric energizer ring 42 and a rigid mask structure 44, as will hereinafter be more fully described.

The rigid seal ring 40 is constructed of a suitable sealing material, such as plastic, Teflon (PTFE) or composite of similar materials and of a construction for receipt within the seal groove 30. In particular, the seal ring 40 has an outer cylindrical sealing surface 46, a pair of opposite ends 48, 50 and an inner surface 52. The opposite ends 48, 50 are axially spaced apart a predetermined distance that is slightly less than the distance between the side surfaces 32, 34 of the seal groove 30 so as to permit the close receipt of the seal ring 40 within the groove 30. The rigid seal ring 40 is preferable split, as is conventional, to facilitate the assembly of the seal ring 40 into the groove 30. Each of the opposite ends 48, 50 of the seal ring 40 make abutting contact with the adjacent side surface 32, 34 of the groove 30. The seal ring 40 also has a sufficient thickness to enable a portion of the seal ring to extend beyond the groove 30 and to span the gap 24 between the outer cylindrical surface 22 of the piston 12 and the cylinder bore 18 to enable the outer sealing surface 46 of the seal ring 40 to be positioned in sealing contact with the cylinder bore 18 of said hydraulic cylinder 14 while an inner portion of the seal ring 40 remains seated within the seal groove 30. With the seal ring 40 mounted within the groove 30, the inner surface 52 thereof is spaced a distance above the bottom surface 36 of the groove 30 so as to define an annular cavity 58 therebetween. Due to the shape of the seal groove 30, such cavity 58 has a generally rectangular cross-sectional configuration of a predetermined volumetric capacity.

The elastomeric energizer ring 42 is adapted for receipt within the annular cavity 58. The energizer ring 42 may be constructed of any well-known elastomeric material, such as a synthetic rubber material with nitrile rubber being preferred. The energizer ring 42 preferably has a generally elliptical cross-sectional configuration when in a free-state (non-compressed state) and is of a size to provide the energizer ring 42 with a total volume which is less than the volumetric capacity of the cavity 58 when the seal ring 40 is operatively mounted within the bore 18 of the cylinder 14. Those skilled in the art will appreciate that the energizer ring may be constructed in other shapes, such as a circular or other suitable shape, so long as the volume of the energizer ring 42 does not exceed the volumetric capacity of the seal cavity 58 when fully loaded by the seal ring 40 as the volume of the energizer ring 42 is non-compressible and so long as thermal expansion and swelling factors are taken into consideration.

Figure 3:
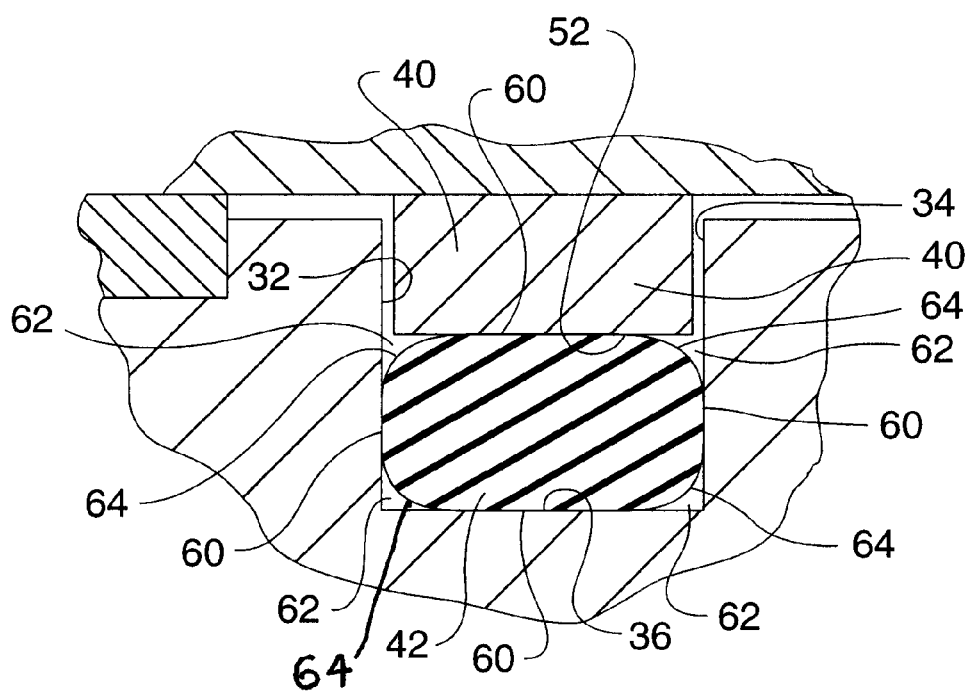
FIG. 3 is an enlarged cross-sectional view similar to FIG. 2, but with the mask structure removed to better show voids in which such mask structure resides.

As shown in the drawings, the energizer ring 42 is transformed from its elliptical shape to a shape that conforms more closely to the shape of the cavity 58 due to the radially inward compressive loads exerted on the energizer ring 42 by the seal ring 40 upon the seal ring 40 being pushed further into the groove 30 as when the piston 12 is mounted into the cylinder bore 18. In the "compressed" condition, the energizer ring 42 has surface portions indicated at 60 engaging and conforming to the side surfaces 32, 34 and bottom surface 36 of the groove 30, as well as the inner surface 52 of the seal ring 40. However, it should be noted that, and as shown in FIG. 3, the energizer ring 42 does not completely fill the cavity 58, whereby voids 62 located at the corners of the cavity normally occur so as to define exposed surface portions 64 of the energizer ring 42 that are not in contact with either the surfaces 32, 34, 36 of the groove 30 or the inner surface 52 of the seal ring 40. It should be noted that the mask structure 44 is removed from FIG. 3 in order to better depict the voids 62 and the exposed surface portions 64. Such voids 62 occur at the junctures between the radial side surfaces 32, 34 and bottom surface 36 of the groove 30 and between the radial side surfaces 32, 34 of the groove 30 and the inner surface 52 of the seal ring 40. The voids 62 important to the present invention are ones at the latter junctures or the junctures between the side surfaces 32, 34 of the groove 30 and the inner surface 52 of the seal ring 40, as it is these exposed surfaces 64 of the energizer ring 42 at these locations that are impinged by high fluid pressure and any air contained in the hydraulic fluid under such high pressure.

In accordance with the present invention, the rigid mask structure 44 is disposed in at least one of the outer voids 62 and has a surface 66 disposed (FIG. 2) in abutting contact with and masking a majority of the adjoining exposed surface portion 64 of the energizer ring 42. Preferably, the mask structure 44 is constructed so to mask the exposed surface portion 64 of the energizer ring 42 on the opposite side as well.

The mask structure 44 is constructed of any suitable rigid material. A rigid plastic, such as unfilled aliphatic polyketone, glass filled polyamide, glass filled polyphthalamide, glass filled polyetheretherketone or the like, has been used with satisfactory results. It should be noted that it is contemplate that the mask structure 44 may take many different forms and shapes in performing the desired masking function as hereinafter more fully described in connection with some of the preferred embodiments of the invention.

Figure 4:
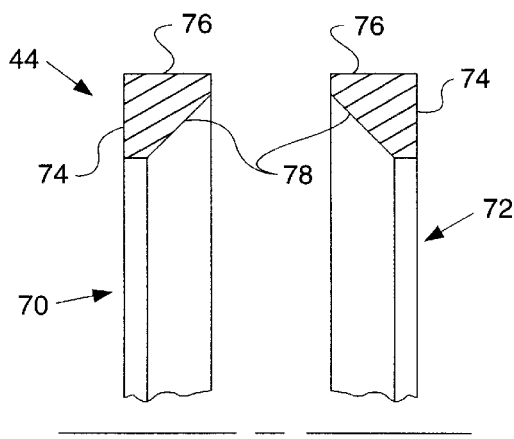
FIG. 4 is an enlarged cross-sectional view of the mask structure illustrated in FIG. 2 by itself.
Figure 5:
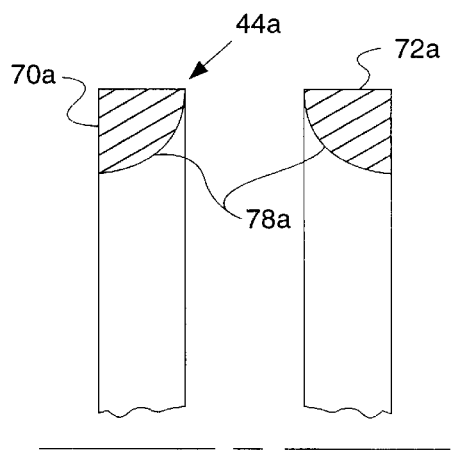
FIG. 5 is an enlarged cross-sectional view of a first alternate embodiment of mask structure of the present invention.
Figure 6:
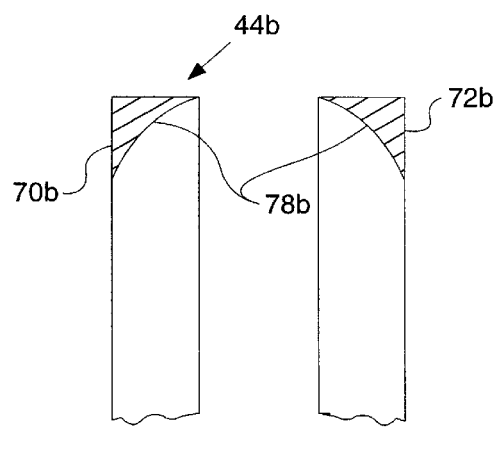
FIG. 6 is an enlarged cross-sectional view of a second alternate embodiment of mask structure of the present invention.
Figure 7:
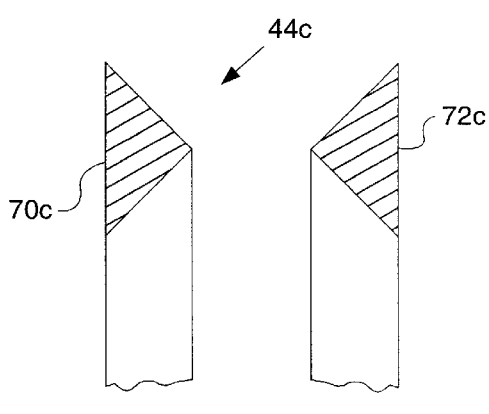
FIG. 7 is an enlarged cross-sectional view of a third alternate embodiment of mask structure of the present invention.

In one embodiment of the present invention, the mask structure 44 includes a pair of individual split wedge rings 70, 72, as depicted in FIGS. 2 and 4. Each ring 70, 72 has a radial leg 74 for location along the radial side surface 32, 34 of the groove 30, an axial leg 76 for location along the inner surface 52 of the seal ring 40 and an angled leg 78 for location along and for abutting contact against and masking a majority of adjacent exposed surface portion 64 of the energizer ring 42. The angled leg 78 thus provides the surface 66 of the mask structure 44. The angled side 78 illustrated in FIGS. 2 & 4 is straight in cross-section, but is actually of a conical shape.

Other embodiments of the present invention are depicted in FIGS. 5–11, wherein like components are given like reference numerals followed by a different alphabetic designator. In a second embodiment of the present invention illustrated in FIG. 5, wedge rings 70*a* and 72*a* for mask structure 44*a* have a modified angled leg 78*a*, which is convex, rather than straight as shown in FIG. 4. In a third embodiment illustrated in FIG. 6, an angled leg 78*b* of wedge rings 70*b* and 72*b* is concave. In a fourth embodiment, wedge rings 70*c* and 72*c* may be configured to a shaped illustrated in FIG. 7. With this configuration however, the ends 48, 50 of the seal ring 40 must be chamfered in order to accommodate the angled upper portion of such rings.

A fifth embodiment is illustrated in FIG. 8, wherein a mask structure 44d may constitute a single piece ring 80 that masks both end corners of the cavity 58. In this embodiment, the ring 80 has a continuous arcuate inner surface 82. The energizer ring 80 is configured such that it is slightly compressed in the rest position.

In a sixth embodiment shown in FIG. 9, a mask structure 44e is divided into two wedge ring halves 70e and 72e along a circumferentially extending radial split 84. In this embodiment, each ring half 70e, 72e has an inner surface with an angled surface portion 86 connecting to an axially extending surface portion 88.

In a further embodiment of the present invention, it is contemplated that the mask structure 44 be integral with the seal ring 40 of the previous embodiments. FIG. 10 illustrates one of such integral configurations, wherein an integral seal ring and mask structure 90 has a pair of integral triangular wedge members 92, 94 at each end 48e, 50e of the seal ring portion 40e and an inner surface 96 extending therebetween, and which provides compression in the resting state.

In still another embodiment, a combined seal ring and mask structure 100 is illustrated in FIG. 11, but with the combined structure 100 being divided into two halves 102, 104 along a radial split 106.

INDUSTRIAL APPLICABILITY

The piston seal 10 constructed in accordance with the teachings of the present invention advantageously provides longer sealing life in high pressure hydraulic applications, such as found in hydraulic cylinders and hydraulic suspension struts used by off-highway trucks and large earthmoving vehicles, such as tractors, loaders, excavators and the like. The piston seal 10 may also be used in cranes, in oil and natural gas recovery equipment and in any application where high pressure gas is sealed by an elastomeric material.

During operation of the hydraulic cylinder 12, fluid pressure levels will fluctuate dramatically and high pressures may be sustained for extended periods of time, such as during periods when the equipment is not being operated, as will be appreciated by those skilled in the art. As a consequence, the highly pressurized fluid will flow around the seal ring 40 into the voids 62 and annular cavity 58. In cases where such highly pressurized fluid contains air or other dissolved gases, such gases may penetrate the skin of the elastomeric energizer ring 42 through pores or minute cracks in the skin.

Penetration of the gas is more likely when the cross-linked bonds of the elastomeric material have been broken due to deformation of the elastomeric energizer ring 42. This is because the elastomeric energizer ring 42 is in tension during deformation, which results in increased porosity of the elastomeric material. This increased porosity subjects the elastomeric energizer ring 42 to increased gas permeation.

When use of the hydraulic cylinder 14 is reactivated, the high fluid pressure may be suddenly or instantaneously released. When this happens, the volume of the air entrapped under the surface skin of the elastomer of the energizer ring 42 expands suddenly as well, in what is called "explosive decompression." This explosive decompression can cause the bursting of the skin and the bulk material of the elastomer, causing small fragments of the elastomer to be torn away from the energizer ring 42 and creating pits in the skin of the elastomer. Such pits or internal ruptures enhance the ability for more air to permeate even further into the elastomer during subsequent high pressurizations of the cylinder 14. This accelerates the pitting and further deterioration of the elastomer of the energizer ring 42, resulting in the loss of its ability to urge the seal ring 40 into sealing contact with the bore 18 of the cylinder 14 and the ultimate failure of the seal 10.

The mask structure 44 of the present invention is effective in reducing the tendency of air or other dissolved gases in the highly pressurized fluid of the cylinder 14 to penetrate the skin of the energizer ring 42. This is accomplished in two ways. First, the mask structure 44 covers the normally exposed surface portion 64 of the energizer ring 42 and creates a pressure differential between the highly pressurized fluid existing in the cylinder 14 and the fluid pressure actually impinging on this surface area 64 of the energizer ring 42. Second, the mask structure 44 is effective in "pushing in" on the effected surface portion 64 of the energizer ring 42 so that the tension in the surface portion 64 is reduced, is eliminated or is changed to compression, thus closing up the pores and any cracks in the skin of such surface portion 64.

As is apparent from the above description and the drawings, the piston seal 10 utilizing the mask structure 44 of the present invention has a decreased chance for air to permeate into the energizer ring 42 and, thus, is less susceptible to injurious explosive decompression of the air when fluid pressure is suddenly released from the hydraulic cylinder 14.

Other aspects, objects and advantages of the present invention can be obtained with a study of the drawings, the disclosure, and the appended claims.

What is claimed is:

1. A piston seal for a high pressure hydraulic cylinder having a piston reciprocatably mounted within a cylinder bore of said hydraulic cylinder, said piston having a seal groove formed therein with a bottom side surface, said piston seal comprising:

a rigid seal ring adapted for receipt within said seal groove and having an innermost surface spaced from said bottom side surface of said groove so as to define an annular cavity therebetween;

an elastomeric energizer ring adapted for receipt within said annular cavity under said seal ring and being of a volumetric size smaller than said cavity so as not to define at least one void in said cavity wherein said energizer ring has an exposed surface portion that is not in contact with said groove or said seal ring; and a rigid mask structure disposed in said void, having a surface disposed in abutting contact with and masking a majority of said exposed surface portion of said energizer ring and having a radially outermost surface in abutting contact with only the innermost surface of the rigid seal ring.

2. The piston seal of claim 1 wherein said annular cavity has a generally rectangular cross-sectional shape and wherein said energizer ring has a generally elliptical cross-sectional configuration when in a free-state whereby a pair of said voids are formed in opposite corners of said cavity, and whereby said energizer ring has a pair of said exposed surface portions at said voids.

3. The piston seal of claim 2 wherein said rigid mask structure includes a pair of wedge rings, each wedge ring being located within a respective one of said voids and each having an angled side confronting a respective one of said exposed surface portions of said energizer ring.

4. The piston seal of claim 3 wherein each of said wedge rings has a generally triangular cross-sectional configuration including a radial side and an axial side in addition to said angled side.

5. The piston seal of claim 3 wherein said angled side is generally straight.

6. The piston seal of claim 3 wherein said angled side is concave.

7. The piston seal of claim 3 wherein said angled side is convex.

8. The piston seal of claim 3 wherein said seal groove has opposite radial side surfaces and said seal ring has a pair of opposite ends, said pair of ends being spaced a predetermined distance apart for receipt within a closely spaced relationship to a respective one of said opposite side surfaces of said groove and said seal ring further having an outer cylindrical sealing surface, said outer sealing surface being positionable in sealing contact with said cylinder bore of said hydraulic cylinder.

9. The piston seal of claim 1 wherein said seal groove is defined by a pair of opposite radial side surfaces and wherein said void is defined at a corner formed between one of said side surfaces of the groove and the innermost surface of said seal ring and a second void is defined at a corner formed between the other of said side surfaces of the groove and the innermost surface of said seal ring whereby said energizer ring has a second exposed surface portion that is not in contact with said groove or said seal ring, and wherein said mask structure includes a pair of rigid mask rings each being disposed in a respective one of said voids and each having a surface disposed in abutting contact with and masking a majority of their respective exposed surface portions of said energizer ring.

10. The piston seal of claim 1 wherein said mask structure is effective in generating a sufficient pressure differential between the pressure of said hydraulic cylinder and said elastomeric energizer ring so as to prevent significant air infiltration into said elastomeric energizer ring and in reducing damage to said elastomeric energizer ring due to explosive decompression when said hydraulic cylinder is depressurized.

11. A piston seal for a high pressure hydraulic cylinder having a piston reciprocatably mounted within a cylinder bore of said hydraulic cylinder, said piston having an outer cylindrical surface adjacent said inner bore and a generally rectangularly shaped seal groove formed in said outer cylindrical surface defined by a pair of opposite radial side surfaces and an axial bottom side surface, said piston seal comprising:

a rigid seal ring adapted for receipt within said seal groove, said seal ring having an outer cylindrical sealing surface, a pair of opposite ends and an innermost surface, said outer sealing surface being positionable in sealing contact with said inner bore of said hydraulic cylinder, said pair of ends being spaced a predetermined distance apart for receipt within a closely spaced relationship to a respective one of said opposite side surfaces of said groove and said inner surface being spaced from said bottom side surface of said groove so as to define an annular cavity therebetween having a generally rectangular cross-section;

an elastomeric energizer ring adapted for receipt within said annular cavity, said energizer ring having a generally elliptical cross-sectional configuration when in a free-state and being of a size to contact the innermost surface of said seal ring and said bottom side surface of said groove and to be radially compressed when said piston is mounted in said bore of said hydraulic cylinder so as to generate an outward radial force on said seal ring for urging said seal ring into sealing contact with said inner bore of said hydraulic cylinder, but to not completely fill said annular cavity so as to define at least one void located in one of the corners of said cavity defined at the juncture of one of the radial side surfaces of the seal groove and the innermost surface of the seal ring wherein said energizer ring has an exposed surface portion that is not in contact with said groove or said seal ring; and a rigid mask structure disposed in said void, having a surface disposed in abutting contact with and masking a majority of said exposed surface portion of said energizer ring, and having a radially outermost surface in abutting contact with only the innermost surface of the rigid seal ring.

12. A piston seal assembly for a high pressure hydraulic cylinder comprising:

a rigid seal ring adapted for receipt within a seal groove and having an innermost surface spaced from a bottom side surface of said groove so as to define an annular cavity therebetween;

an elastomeric energizer ring adapted for receipt within said annular cavity under said seal ring and said energizer ring further having an exposed surface portion that is not in contact with said groove or said seal ring; and a rigid mask structure having a generally triangular cross-sectional configuration including a radial side, an axial side and an angled side, said rigid mask structure disposed in abutting contact with and masking a majority of said exposed surface portion of said energizer ring wherein said radial side is disposed in abutting contact with only the innermost surface of the rigid seal ring.

13. The piston seal assembly of claim 12 wherein said annular cavity has a generally rectangular cross-sectional shape and wherein said energizer ring has a generally elliptical cross-sectional configuration when in a free-state whereby a pair of voids are formed in opposite corners of said cavity.

14. The piston seal assembly of claim 13 wherein said rigid mask structure includes a pair of wedge rings, each wedge ring being located within a respective one of said voids and each having said angled side confronting a respective one of said exposed surface portions of said energizer ring.

15. The piston seal assembly of claim 12 wherein said angled side is generally straight.

16. The piston seal assembly of claim 12 wherein said angled side is concave.

17. The piston seal assembly of claim 12 wherein said angled side is convex.

18. The piston seal of claim 12 wherein said mask structure is effective in generating a sufficient pressure differential between the pressure of said hydraulic cylinder and said elastomeric energizer ring so as to prevent significant air infiltration into said elastomeric energizer ring and in reducing damage to said elastomeric energizer ring due to explosive decompression when said hydraulic cylinder is depressurized.

* * * * *